United States Patent

[11] 3,584,458

| | | |
|---|---|---|
| [72] | Inventor | John M. Wetzler<br>Indianapolis, Ind. |
| [21] | Appl. No. | 879,728 |
| [22] | Filed | Nov. 25, 1969 |
| [45] | Patented | June 15, 1971 |
| [73] | Assignee | General Motors Corporation<br>Detroit, Mich. |

[54] TURBINE COOLING
9 Claims, 4 Drawing Figs.

[52] U.S. Cl. ............................................. 60/39.02,
60/39.66, 415/115, 415/160
[51] Int. Cl. ............................................. F02c 7/18
[50] Field of Search ........................................ 60/39.66,
39.02; 415/115, 160

[56] References Cited
UNITED STATES PATENTS

| 2,811,833 | 11/1957 | Broffitt............. | 60/39.66 |
| 2,951,340 | 9/1960 | Howald............. | 60/39.66 |
| 3,224,194 | 12/1965 | Feo................. | 60/39.66 |
| 3,452,542 | 7/1969 | Saferstein......... | 60/39.66 |

*Primary Examiner*—Douglas Hart
*Attorneys*—Paul Fitzpatrick and Jean L. Carpenter ABSTRACT: A turbine of a gas turbine engine which operates at high temperatures is supplied with cooling air from the compressor of the engine. To reduce flow of cooling air and increase the efficiency of the engine at lower temperatures where less cooling is required, the flow of cooling air is modulated, without reducing pressure, by increasing the temperature of the cooling air. This is accomplished by circulating part of the cooling air in heat exchange relation to the combustion apparatus of the engine and mixing the cooling air taken directly from the compressor with cooling air thus heated as required. Valves to vary the ratio of the two cooling air streams may be structurally independent of the turbine and controlled by fuel flow or turbine temperature. Alternatively, the cooling air modulation valves may be part of a variable turbine nozzle the setting of which is varied in accordance with engine operating temperature.

INVENTOR
John M. Wetzler
BY
Paul Fitzpatrick
ATTORNEY

TURBINE COOLING

My invention is directed to gas turbine engines and particularly to improvements in methods and arrangements for cooling the turbines of such engines.

It is common practice to increase the operating temperatures of gas turbine engines by cooling the hotter parts of the turbine with air taken from the compressor of the engine. In the simplest and usual form of such cooling arrangements, a constant proportion of compressor discharge air is directed to the turbine for cooling. This proportion is based upon the amount required for cooling at the highest engine operating temperature.

There have been proposals to valve the flow of cooling air, but this leads to undesirable complications inasmuch as the source of the cooling air is very little above the highest pressure in the turbine, and throttling to reduce flow leads to unbalancing of flow and starvation of cooling air to some of the parts which particularly need cooling.

It has occurred to me that this difficulty may be obviated and a wasteful oversupply of cooling air under operating conditions below the maximum may be reduced by maintaining the supply of cooling air at constant pressure relative to the maximum pressure developed in the engine (which varies with operating conditions) and modulating the flow of cooling air by varying its temperature. This is effected by raising the temperature of the cooling air under conditions where less cooling is required. With the cooling air metered through a constant area orifice or orifices or through the walls of a set of porous vanes or blades, for example, as the temperature increases, the mass of cooling air flowing decreases at any given pressure. Mass flow of gas through an orifice is inversely proportional to the square root of absolute temperature, other conditions remaining constant.

To put may invention into practice, it is necessary only to provide means for deriving cooling air from the compressor of the engine and for heating the air to a desired extent prior to its introduction into the turbine. This is conveniently accomplished according to the preferred embodiment of my invention by providing two paths for the cooling air from the compressor to the turbine one of which is substantially unheated or uncooled and the other of which is heated substantially by heat exchange from the combustion apparatus of the engine, preferably to about the temperature of the turbine motive fluid. With the two sources of cooling air, it is possible by a simple valve arrangement to take the air from either source or to vary the proportions of air taken through the two paths so as to arrive at the desired flow of cooling air.

The control of flow may be in response to an indication of turbine temperature or to some other parameter indicative of it such as power setting of the engine fuel control. In an engine where the nozzle vane setting is varied in some relation to turbine temperature, the control of the air mixing valve may be effected by coupling it directly to one or more of the turbine nozzle vanes or the turbine nozzle van actuating mechanism.

The principal objects of my invention are to improve the efficiency and fuel economy of high temperature gas turbine engines; to provide improved cooling arrangements for gas turbines; to provide means for varying the temperature of cooling air supplied to a gas turbine; to provide two circuits for cooling air to a gas turbine one of which includes arrangements for heating the air with means for mixing the two flows in desired proportions to control the temperature of cooling air; to provide improved valve means for such controls; and to provide means for varying the flow of cooling air to gas turbine without significantly varying the pressure of the air supplied.

The nature of my invention and its advantages will be clear to those skilled in the art from the succeeding detailed description of two preferred embodiments of the invention and the accompanying drawings thereof.

For the purpose of understanding my invention, the illustrated turbine structure may be regarded as conventional although specifically it follows that described in detail in an application of Earle R. Wall for Variable Turbine Nozzles, Ser. No. 836,423, filed June 25, 1969. Likewise, the combustion apparatus may be regarded as conventional except for the addition of means for heating cooling air from the combustion apparatus.

Figure 1:
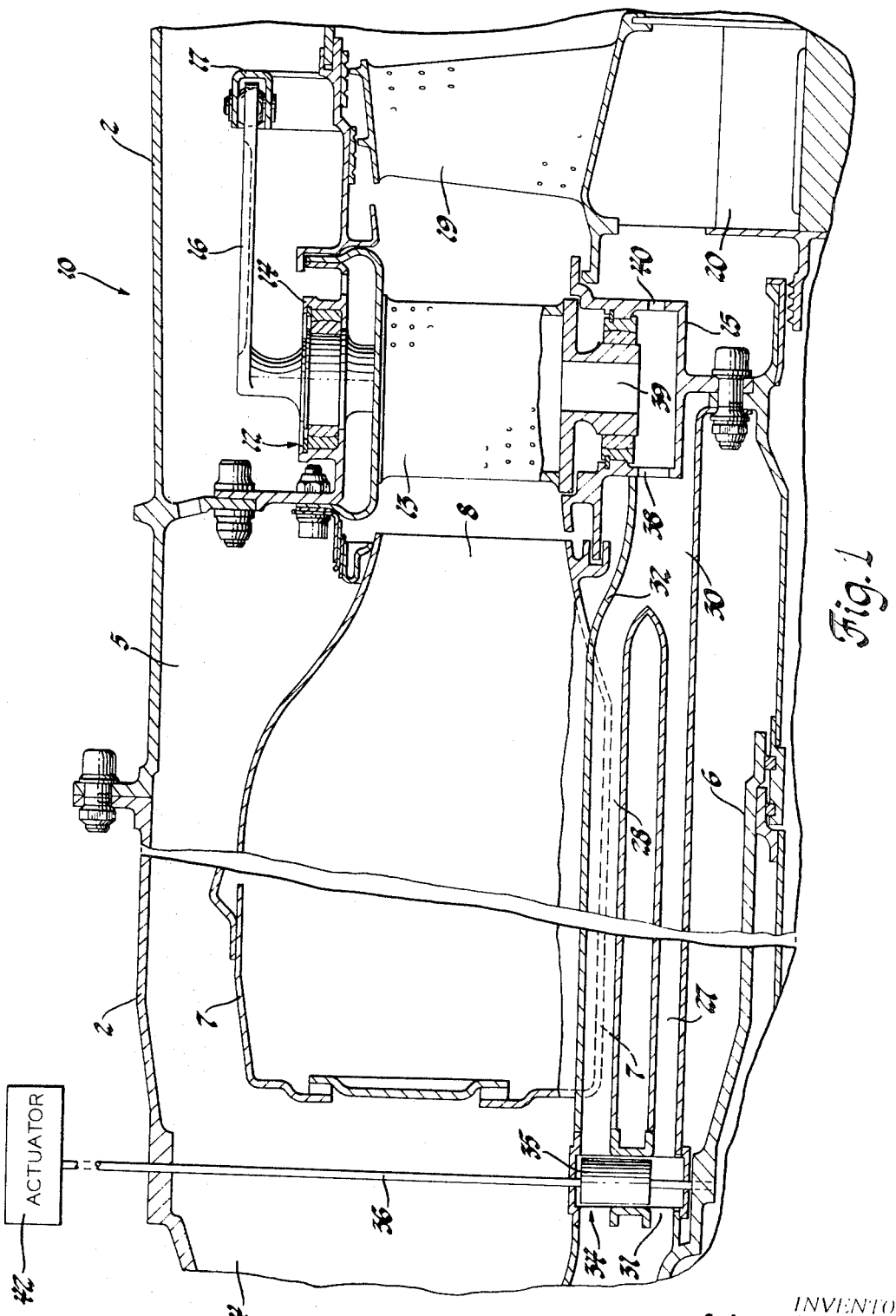
FIG. 1 is a partial sectional view of a gas turbine engine taken on a plane containing the axis of the engine and illustrating the combustion apparatus and first turbine stage.

Referring first to FIG. 1, the engine includes an outer case or wall 2 which defines the outer boundary of a compressor 3 (FIG. 4) only the diffuser portion 4 of which is shown in FIG. 1. The case 2 also defines the outer wall of a combustion apparatus 5, the inner wall of which is defined by an annular shaft housing 6. A combustion liner or liners 7 receive air from the compressor and deliver it through an outlet 8, which may be annular or may be a plural number of outlets, into a turbine 10 which is connected by a shaft 11 to drive the compressor.

The turbine 10 includes a first stage nozzle 12 with variable setting vanes 13 which, as illustrated, are of a porous character for cooling by transpiration of cooling air from within the hollow vanes to the outer surface of the vanes. The vanes are mounted in an outer shroud 14 and an inner shroud 15 by bearings which receive shafts integral with the vanes and which terminate in actuating arms 16 coupled to a unison ring 17 which may be moved by means immaterial to the present invention to change the setting of all the nozzle vanes 13 concurrently in operation of the engine. As the power setting and the temperature of the engine increase, the vanes are adjusted to increase the throat area of the turbine nozzle. The motive fluid discharged from the vanes 13 acts against blades 19 on a turbine wheel 20.

Figure 4:
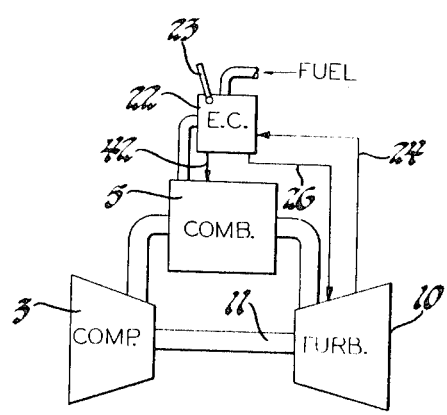
FIG. 4 is a schematic diagram of a gas turbine engine and control therefor.

As indicated in FIG. 4, fuel is supplied to the combustion apparatus 5 by suitable fuel spray nozzles (not illustrated), the flow to which is controlled by an engine control or fuel control 22 which may be set for desired engine operating temperature by a control lever 23. The fuel control may receive various inputs from the engine including an input indicative of turbine temperature through a circuit 24 which may represent a thermocouple output, for example. A suitable arrangement for shifting the vanes concurrently with changes in engine operating conditions is indicated by the line 26 on the schematic of FIG. 4.

FIG. 1 illustrates a pair or set of conduits 27 and 28 to supply cooling air to the turbine nozzle 12. This pair of conduits is representative of a plural number of sets of such conduits distributed around the axis of rotation of the engine. Conduits 27 and 28 merge into a delivery manifold 30 adjacent the turbine nozzle. This manifold may extend entirely around the engine or there may be a number of separate manifolds each supplied by the set of conduits 27 and 28. Conduit 27, a conduit for cool turbine cooling air, is supplied through an inlet 31 communicating directly with the outlet of the compressor 3. Conduit 28 is for relatively hot cooling air and has an outer wall 32 which forms effectively part of the inner wall of the combustion liner 7 so that this wall 32 is exposed to the hot gas within the combustion liner and to radiation from the flame. The amount of air delivered through the two conduits may be varied in inverse relation by a valve 34 comprising a valve member 35 movable radially of the engine. As will be apparent from the figure, the valve member 35 is shown in the position to block the inlet to the hot air conduit 28 and to leave the conduit 27 fully open. If the valve is moved downward as shown in FIG. 1, the supply of air to the hot air path is increased while that to the cool air path is correspondingly diminished. If the valve is moved all the way down, the cool air is cut off and only hot air is supplied to the turbine through manifold 30. Valves 35 may be operated by any suitable mechanism, in this case illustrated by a push rod 36 which may be coupled to any suitable actuator 42 to move the valve as desired in response to conditions calling for modulation of the temperature of the turbine cooling air.

The inner shroud 15 of the turbine nozzle is a hollow boxlike structure with air entrance openings 38 distributed around its circumference communicating with the (or each) manifold 30. The air can flow from shroud 15 through a passage 39 in the hollow stem of each vane 13 to the interior of the vanes from which it diffuses through the porous wall of the nozzle vane. The details of the porous vane structure are immaterial to the present invention. Small holes 40 in the rear wall of the shroud 15 allow some of the cooling air to flow into the rim portion of turbine wheel 20 and thus into turbine blades 19.

The valve actuating rods 36 might be coupled to the unison ring 17 or to an actuator for this ring. However, as indicated in FIG. 4, a suitable control arrangement indicated schematically as 42 extends from the engine control 22 to operate the valve members 35. Such a control member 42 might respond to the power setting of engine control 23, to the temperature reading fed to the engine control by connection 24 from the turbine, or to any other suitable phenomenon indicative of the demand for cooling.

Figure 3:
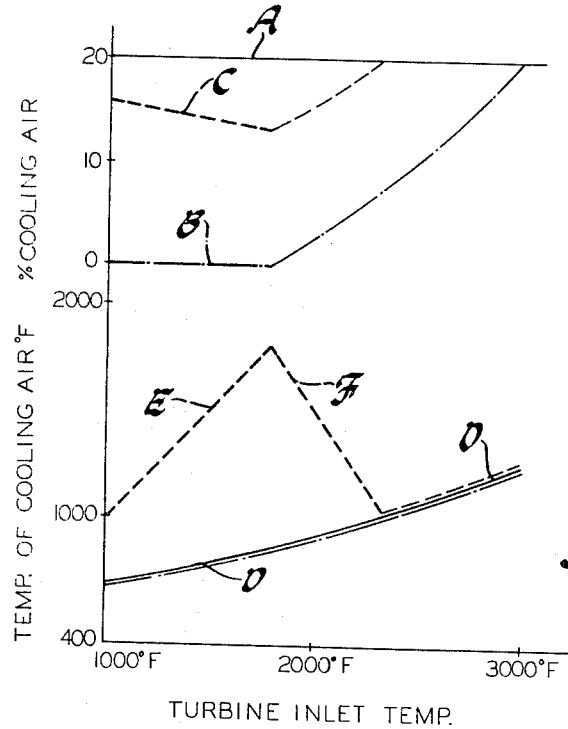
FIG. 3 is a graphical representation of certain factors involved in the control of cooling air.

Referring to FIG. 3, this presents curves illustrating cooling air flow and cooling air temperature, both as a function of turbine inlet temperature. Line A at the top of the figure represents a 20 percent diversion of compressor air flow for cooling air for a very high temperature engine. With no control of cooling air, the same 20 percent would be diverted at all conditions of engine operation, as indicated by the horizontal line A. Line B represents what might be done in terms of cooling if it were feasible to control simply by throttling flow of cooling air, in which case there might be no flow of cooling air up to say 1,800° F. turbine inlet temperature and then a gradually increasing flow to the maximum value of 20 percent as the turbine temperature increases above 1,800° F. This sort of solution is not feasible for high temperature components which are in a high pressure area near compressor discharge pressure, such as the first stage turbine nozzle, because of the starvation of some areas of the vane as the pressure diminishes. The total head available for supplying cooling air to the turbine nozzle, particularly the vane leading edges, is very slight, being substantially only the pressure drop into the combustion liner. The curve C in FIG. 3 indicates the possible reduction of cooling air by the application of the principles of this invention. Here the cooling air is reduced by something like 4 percent, which is 20 percent of the maximum, at 1,000° engine temperature and by about 30 percent of the maximum at 1,800°. Beyond this point, the cooling flow increases until it reaches the full 20 percent value at about 2,500° F. engine temperature.

The lower set of curves illustrates the temperature conditions causing this modulation of flow. The line D represents the temperature of the unheated compressor discharge air which would be the normal source of air for turbine cooling. As apparent, the compressor discharge temperature rises with engine power output from approximately 650° in this case at engine idling conditions to about 1,200° at full engine power. The line E represents the temperature of the heated compressor discharge air which is indicated as being at approximately turbine inlet temperature through heat exchange with the combustion apparatus. This air, therefore, rises in temperature from 1,000° F. at engine idle to 1,800° F. at 1,800° turbine inlet temperature, this line corresponding to the downward slope of curve C above. At 1,800° F. it becomes necessary to augment the flow of cooling air and to employ cooler air for cooling so, as the engine power level increases, the heated cooling air is mixed with increasing quantities of the unheated cooling air as shown by line F and thus the temperature of the air supplied to the turbine decreases until finally the curve F intersects the curve D. The curve F corresponds to the rising portion of the curve C above. As engine temperature further increases, cooling air is supplied only through conduit 27 at compressor discharge temperature along line D. Thus, as turbine temperature increases cooling is effected initially by the warmed air, then by a varying mixture, and finally by the unwarmed air.

Figure 2:
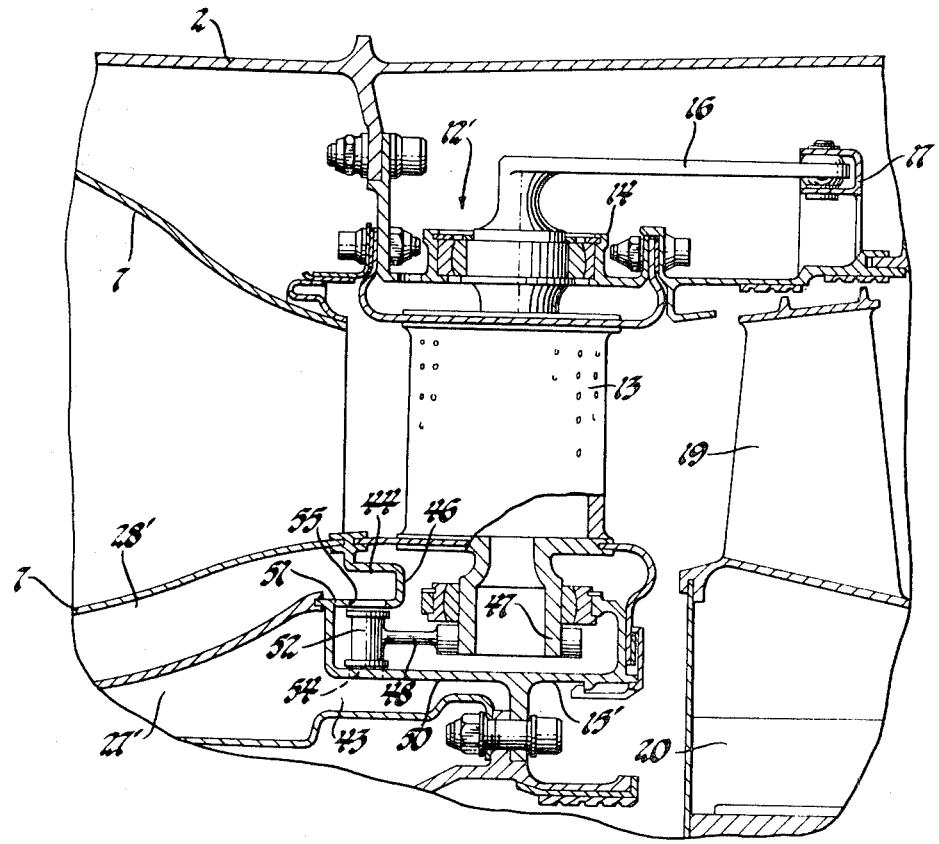
FIG. 2 is a view similar to FIG. 1 illustrating a modified turbine arrangement.

FIG. 2 illustrates a second embodiment of the invention which is similar in many respects to that previously described, the significant difference being that the valve arrangements for controlling the relative amounts of cool and warm cooling air are built into the turbine nozzle and are directly actuated from the rotatable vanes. Parts in FIG. 2 which are the same as those previously described with respect to FIG. 1 are given the same numbers, and corresponding parts somewhat modified are given the same numbers with primes.

In FIG. 2, one or more conduits 27' which are isolated from the combustion liner 7 deliver cooling air to a manifold or manifolds 43 radially inward from the forward part of the turbine nozzle inner shroud 15'. Conduits 28' carrying compressed air in heat exchange relation to the wall 7 of the combustion liner terminate in an annular manifold or a plurality of delivery spaces 44 defined in the forward wall 46 of the turbine nozzle. Some of the vanes 13 have extended shafts 47 which project beyond the bearing for the vane in the inner shroud. Arms 48 fixed to these shafts sweep circumferentially of the engine between the inner surface and over surface 51 of the inner shroud. Valve members 52 integral with these arms 48 are thus moved slidingly over or away from cool air inlets 54 and hot air inlets 55 which are staggered circumferentially of the nozzle. The relative location of holes 54 and 55 with respect to the movable valve member 52 can obviously be arranged to achieve a correlation between the temperature of the cooling air and the position of the nozzle vane, which latter is a function of or an indication of the temperature level of engine operation.

It will be clear that in both forms of the invention a substantial reduction in extraction of air from the compressor cooling purposes may be made under some conditions of engine operation. Particularly, the utilization of the invention may result in very substantial increases in engine fuel economy at cruise and low power modes of operation. Since this modulation is effected without any change in the relative pressure of the cooling air with respect to the motive fluid supplied to the turbine, there is no disturbance of flow patterns in the cooling of various areas of the vanes and blades, which are adequately served at all conditions of engine operation.

The detailed description of preferred embodiments of my invention for the purpose of explaining the principles thereof is not to be considered in any limiting sense as many modifications may be made by the exercise of skill in the art.

I claim:

1. A method of cooling the turbine of a gas turbine engine including a compressor, combustion apparatus, and a turbine, the method comprising providing a first supply of turbine cooling air derived from the compressor; providing a second supply of cooling air derived from the compressor; heating the second supply to a temperature higher than that of the first supply; and conducting cooling air from the two said supplies to the turbine in varying relative quantities so as to modulate the cooling air flow to the turbine.

2. A method of cooling the turbine of a gas turbine engine including a compressor, combustion apparatus, and a turbine, the method comprising providing a first supply of turbine cooling air derived from the compressor; providing a second supply of cooling air derived from the compressor; circulating the second supply of cooling air in heat exchange relation to the combustion apparatus so as to heat the second supply to a temperature higher than that of the first supply; and conducting cooling air from the two said supplies to the turbine in varying relative quantities so as to modulate the cooling air flow to the turbine.

3. A method of cooling the turbine of a gas turbine engine including a compressor, combustion apparatus, and a turbine, the method comprising providing a first supply of turbine cooling air derived from the compressor; providing a second supply of cooling air derived from the compressor; circulating the second supply of cooling air in heat exchange relation to the combustion apparatus so as to heat the second supply to a temperature higher than that of the first supply; and conducting cooling air from the two said supplies to the turbine in relative quantities varying inversely in response to a condition indicative of turbine temperature so as to modulate the cooling air flow to the turbine as a function of the said condition.

4. A method of cooling the turbine of a gas turbine engine including a compressor, combustion apparatus, and a turbine, the method comprising providing a first supply of turbine cooling air derived from the compressor; providing a second supply of cooling air derived from the compressor, circulating the second supply of cooling air in heat exchange relation to the combustion apparatus so as to heat the second supply to a temperature higher than that of the first supply; and conducting cooling air from the two said supplies to the turbine in relative quantities so as to modulate the cooling air flow to the turbine, in which the turbine is cooled from the second supply in a low temperature range, from both supplies in a middle temperature range, and from the first supply in a high temperature range.

5. A gas turbine engine comprising air compressor means; combustion apparatus supplied by the compressor means; and turbine means supplied with motive fluid by the combustion apparatus, the turbine means being coupled to drive the compressor means; and means for supplying cooling air from the compressor means to the turbine means comprising, in combination first conduit means defining a substantially direct path from the compressor means to the turbine means for supplying relatively cool cooling air; second conduit means defining a cooling air path from the compressor means to the turbine means in heat exchange relationship with a source of heat for supplying relatively warm cooling air; and controllable mixing valve means operable to direct the cooling air from the said conduit means to the turbine means and to vary the ratio of the relatively cool to the relatively warm air.

6. A gas turbine engine comprising air compressor means; combustion apparatus supplied by the compressor means; and turbine means supplied with motive fluid by the combustion apparatus, the turbine means being coupled to drive the compressor means; and means for supplying cooling air from the compressor means to the turbine means comprising, in combination, first conduit means defining a substantially direct path from the compressor means to the turbine means for supplying relatively cool cooling air; second conduit means defining a cooling air path from the compressor means to the turbine means in heat exchange relationship with the combustion apparatus for supplying relatively warm cooling air; and controllable mixing valve means operable to direct the cooling air from the said conduit means to the turbine means and to vary the ratio of the relatively cool to the relatively warm air.

7. An engine as defined in claim 6 in which the valve means is disposed upstream of the conduit means.

8. An engine as defined in claim 6 in which the valve means is disposed downstream of the conduit means.

9. A gas turbine engine comprising air compressor means; combustion apparatus supplied by the compressor means; and turbine means supplied with motive fluid by the combustion apparatus, the turbine means including variable-setting nozzle vanes and being coupled to drive the compressor means; and means for supplying cooling air from the compressor means to the turbine means comprising, in combination, first conduit means defining a substantially direct path from the compressor means to the turbine means for supplying relatively cool cooling air; second conduit means defining a cooling air path from the compressor means to the turbine means in heat exchange relationship with a source of heat for supplying relatively warm cooling air; and controllable mixing valve means operable to direct the cooling air from the said conduit means to the turbine means and to vary the ratio of the relatively cool to the relatively warm air, the mixing valve means including movable valve means coupled to and moved by the variable-setting nozzle vanes.

PO-1050
(5/69)

UNITED STATES PATENT OFFICE
CERTIFICATE OF CORRECTION

Patent No. 3,584,458          Dated   June 15, 1971

Inventor(s)  John M. Wetzler

It is certified that error appears in the above-identified patent and that said Letters Patent are hereby corrected as shown below:

Column 1, line 36, "may" should read -- my --.

Column 4, line 36, after "compressor" insert
-- for --.

Column 5, line 17, after "in" insert -- varying --.

Signed and sealed this 15th day of February 1972.

(SEAL)
Attest:

EDWARD M. FLETCHER, JR.      ROBERT GOTTSCHALK
Attesting Officer           Commissioner of Patents